INVENTOR
JEAN ROBIEUX
BY Paul M. Craig Jr
ATTORNEY

United States Patent Office 3,504,982
Patented Apr. 7, 1970

3,504,982
LASER DEVICE FOR MEASURING VARIATIONS OF A SECOND WAVELENGTH BY MONITORING A FIRST WAVELENGTH
Jean Robieux, Leroux Chatenay-Malabry, France, assignor to Compagnie Generale d'Electricite, Paris, France
Filed Jan. 22, 1965, Ser. No. 427,318
Int. Cl. G01n *21/06, 21/22;* H01s *3/00*
U.S. Cl. 356—201                                                  5 Claims

ABSTRACT OF THE DISCLOSURE

Arrangement for and method of measuring variations in intensity of a first radiation for which there is no sensitive and precise measuring device, by transposition on a second radiation in tight correlation with the first radiation, the second radiation enabling measurement by means of sensitive and precise apparatus, the first and second radiations being generated by a single laser tube forming with a plurality of mirrors respective first and second optical resonators and including a dispersion device for separating the radiations from the laser tube into said first and second radiations for application to said first and second optical resonators, said first optical resonator including a means for absorption of said first radiation.

---

Gas lasers generally emit several radiations simultaneously. In general, only one is used, and the others are thought to be parasitic. On the other hand, in some cases, efforts are made to take advantage of the production of several additional radiations.

The invention relates to lasers of that type wherein the optical cavity has quite specific and remarkably advantageous shape and structure.

The term "optical cavity," or in short "cavity," applies to a space bounded by two mirrors, one of which may be semi-transparent, in which takes place an amplification of the intensity of the optical radiation (independently of the wave generation process) according to a similar process of the phenomenon related to the quality factor or "Q factor" in the cavities used in radio engineering.

The invention relates to gas lasers wherein a number or radiations are created simultaneously in an equal number of cavities having a part thereof in common. It applies more particularly to the case of two simultaneous radiations and two cavities with a common part but it is not limited to that case.

It is a known fact that a laser may operate simultaneously at several different wavelengths originating from the same excitation optical level; for example, a helium-neon laser may operate at the same time at a first wavelength $\lambda_1 = 3.39\mu$ and at another wavelength $\lambda_2 = 0.6328\mu$ respectively between the levels $5s'$ $[1/2]_1$ and $4p'$ $[3/2]_2$, and between the levels $5s'[1/2]_1$ and $3p'$ $[3/2]_2$.

One method for measuring this radiation consists in using a measuring device making it possible to make intensity measurements for instance on the second radiation, which makes it possible to infer thereof the intensty values of the first radiation by taking advantage of an interaction between the two radiations, which is due to their common origin level $5s'$ $[1/2]_1$. Thus, for instance, in a laser emitting at the two above-mentioned wavelengths $\lambda_1$ and $\lambda_2$, it will be relatively easy to measure on $\lambda_2$, with a photomultiplier tube sensitive to shorter wavelengths than $1.2\mu$, the intensity variations of the wavelength radiation $\lambda_1$, selected as a useful one, while the direct infrared measurement involves technological difficulties (need for the detector to be operated in the liquid nitrogen temperature range) and limitations (passband limited to 1 megacycle). In known devices, however, the cavity being adjusted for the resonance of the "useful" radiation $\lambda_1$, has a poor Q-factor for the so-called "reference" radiation $\lambda_2$. While the method takes into account the technological advantages offered by the photomultiplier tube detection, it has, on the other hand, the disadvantage of a poor sensitivity.

Lastly, the prior art also makes use, in lasers operating at several wavelengths, of a dispersing prism placed on the output side of the laser tube in order to separate two emerging rays, one of which is used, and the other, which is not wanted, is eliminated. Thus. in the laser quoted above by way of example, the use of a cavity provided with a prism will enable the production of the $0.6328\mu$ radiation, to the exclusion of the $3.39\mu$ infrared radiation which would otherwise have a much higher intensity than the visible radiation and which, for this reason, would be cumbersome.

By combining the devices described above, a sensitive measuring device is obtained, which makes it possible to transfer, with high efficiency, on an easily observable wavelength, phenomena relating to another wavelength which does not lend itself so well to observation.

According to the invention, a gas laser comprises, generally, several optical cavities between a first mirror which may be semi-transparent and several reflecting mirrors, these cavities having a common part between said single first mirror and one face of a dispersing prism, traversed by radiations at several wavelengths, and individual parts between said face of the prism and the various reflecting mirrors, each of them being traversed by a radiation emitted at a particular wavelength.

The invention will now be described in greater detail by aid of the following description with reference to the accompanying drawings.

Figure 1:
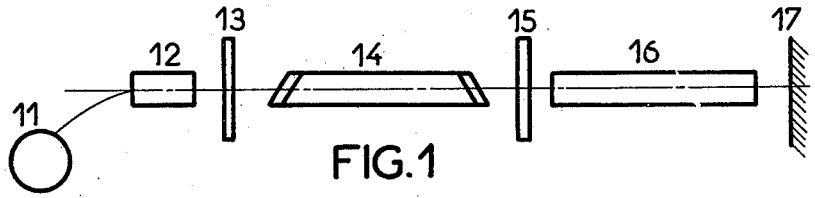
FIGURE 1 is a schematic diagram of a device for measuring a phenomenon relating to a radation emitted by a laser tube by transfer on another radiation emitted by the same laser tube.

In FIGURE 1, the reference numeral 11 indicates an oscilloscope, 12 a photomultiplier tube, 13 a semi-transparent mirror, 14 a laser tube 15, an optical filter, 16 a discharge tube, and 17 a reflecting mirror.

Under the action of an exciting device not shown, two radiations are created in the cavity formed between the semi-transparent mirror 13 and the reflecting mirror 17, the first one being an infrared radiation at $3.39\mu$, the second a visible one at $0.6328\mu$. The infrared radiation is absorbed by a plasma created in the discharge tube 16. The photomultiplier tube 12 is sensitive to the visible light beam, the intensity of which varies linearly as a function of the intensity variations of the infrared radiation.

An oscilloscope 11 connected on the output side of the photomultiplier tube 12 makes it possible to observe the optical path variations undergone by the infrared radiation within the discharge tube. The sensitivity of the device, however, is low due to poor coupling between the laser tube 14 and the part of the cavity comprised between the filter 15 and the mirror 17.

Figure 2:
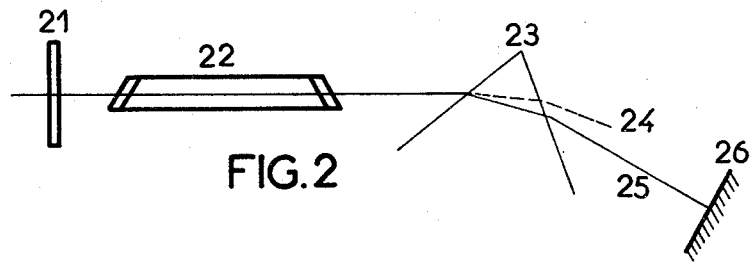
FIGURE 2 shows an example of a single optical cavity of a laser favoring a desired wavelength at the expense of another hindering wavelength.

In FIGURE 2, the reference numeral 21 indicates a semi-transparent mirror, 22 a laser tube, 23 a dispersing prism, 26 a reflecting mirror, 24 the direction which an emerging radiation at an undesirable wavelength $3.39\mu$ would take, 25 a radiation beam at a desired wavelength of 0.6328µ, the creation of which is triggered in the cavity formed between the mirrors 21 and 26. The radiations emitted at a wavelength of 0.6328µ are used in an apparatus not shown here, located on the left-hand side of the semi-transparent mirror 21. In the absence of the prism 23, the infrared radiation which would be created would have a much higher intensity than the visible radiation and it would hinder observations on the visible radiation, a drawback which is avoided by using a prism. The known device includes only one optical cavity, bounded by the mirrors 21, 26. In fact, the radiation which would follow the path 24 is not generated.

Figure 3:
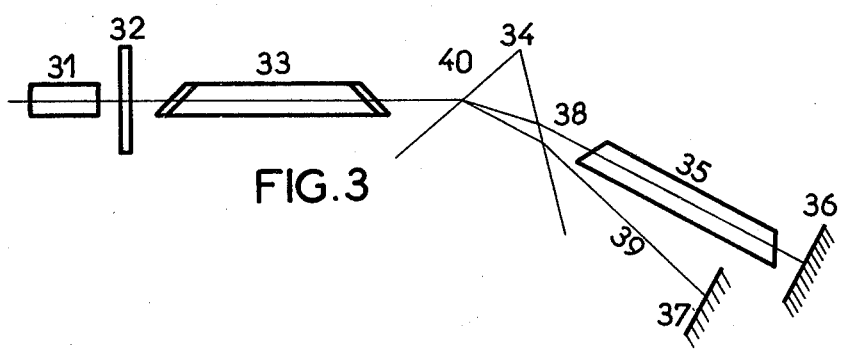
FIGURE 3 shows the optical cavity according to the invention, comprising a common part and several individual parts, greatly increasing the senstivity of the measuring device of FIGURE 1.

On the contrary, in the device according to the invention shown in FIGURE 3, there are two optical cavities: a first cavity bounded by the mirrors 32, 36 contains the laser tube 33, the prism 34, the beam 38, and the absorption enclosure 35; and a second cavity bounded by the mirrors 32, 37 includes the laser tube 33, the prism 34, and the beam 39. These two cavities have a part in common, namely the part comprised between the mirror 32 and the face 40 of the prism 34. Under these conditions, the intensity variations of the radiation at a wavelength $\lambda_1$ which is created in the first cavity as a result of the variations to which is subjected the medium contained in the absorption enclosure 35 (for instance, the radiation at the wavelength 3.39µ traversing a plasma) sharply affect the intensity of the radiation at the wavelength $\lambda_2$ which is generated in the second cavity (for instance 0.6328µ) and the observation of which is easy with the help of a photomultiplier tube 31.

The device according to the invention was described on the basis of the example of the creation of two interacting radiations. It should however be understood that the invention applies also to a laser emitting any $p$ number of radiations within an equal $p$ number of cavities, all of them having a part in common containing a laser tube located between a mirror and the entrance side of a dispersing system.

What I claim is:

1. A laser arrangement for detecting variations in radiation of a first wavelength through observation of variations in radiation of a second wavelength comprising
   a first mirror,
   a laser tube positioned adjacent said first mirror on one side thereof capable of simultaneously generating radiations at said first and second wavelengths,
   second and third mirrors positioned on the other side of said laser tube to form respective resonant cavities therewith,
   dispersing means positioned between said laser tube and said second and third mirrors for dispersing and passing radiation at said first wavelength toward said second mirror and radiation at said second wavelength toward said third mirror,
   absorbing means positioned between said dispersing means and said second mirror absorbing radiation at said first wavelength in proportion to a physical quantity of said absorbing means, and
   measuring means for measuring radiation at said second wavelength generated by said laser tube.

2. A laser arrangement as defined in claim 1 wherein said dispersing means is provided in the form of a prism.

3. A laser arrangement as defined in claim 1 wherein said first mirror is a semi-transparent mirror and said measuring means is positioned on the side of said first mirror opposite said laser tube.

4. A laser arrangement as defined in claim 1 wherein said measuring means includes a photomultiplier, said radiation at said first wavelength being invisible and said radiation at said second wavelength being visible.

5. Method of measuring variations in intensity of a first radiation for which there is no satisfactory measuring device comprising,
   generating from a common source said first radiation simultaneously with a second radiation capable of satisfactory measurement,
   separating and passing said first and second radiations to form respective resonant cavities while maintaining an intercoupling of said first and second radiations in said common source,
   imposing on said first radiations fluctuations in intensity representative of a physical quantity, and
   measuring the intensity variations of said second radiation to detect the fluctuations in said first radiation.

References Cited

UNITED STATES PATENTS

| | | | |
|---|---|---|---|
| 3,402,365 | 8/1968 | Uchida | 331—94.5 |
| 3,177,446 | 4/1965 | Hoadley et al. | 331—94.5 |

OTHER REFERENCES

"Measurement of Plasma Density Using a Gas Laser as an Infrared Interferometer," D. E. T. F. Ashby and D. F. Tephcott; Applied Physics Letters, vol. 3, No. 1, pp. 13–15.

White et al., App. Phys. Lett., vol. 2, No. 11, June 1963, pp. 211–12.

Bloom, App. Phys. Lett., vol. 2, No. 5, March 1963, pp. 101–2.

White, App. Optics., vol. 3, No. 3, March 1964, pp. 431–32.

RONALD L. WIBERT, Primary Examiner

C. CLARK, Assistant Examiner

U.S. Cl. X.R.

331—94.5